United States Patent [19]

Abe et al.

[11] 4,162,484

[45] Jul. 24, 1979

[54] DATA COLLECTION SYSTEM

[75] Inventors: Takeshi Abe, Yokohama; Keishin Tsuchiya, Tachikawa; Kazuhito Saito; Toshiaki Mizuta, both of Kawasaki; Ichiro Yoshihara, Funabashi, all of Japan

[73] Assignee: Ricoh Co., Ltd., Tokyo, Japan

[21] Appl. No.: 798,019

[22] Filed: May 18, 1977

[30] Foreign Application Priority Data

May 26, 1976 [JP] Japan .................................. 51-60776

[51] Int. Cl.² ........................................... H04Q 9/00
[52] U.S. Cl. .................................. 340/150; 340/151; 340/310 A
[58] Field of Search ........... 340/150, 188, 151, 310 A, 340/310 R

[56] References Cited

U.S. PATENT DOCUMENTS

| | | | |
|---|---|---|---|
| 3,040,297 | 1/1962 | Derr | 340/150 |
| 3,300,759 | 1/1967 | Chapman | 340/150 |
| 3,335,227 | 8/1967 | Jackel | 340/150 |
| 3,392,378 | 7/1968 | Perry | 340/150 |
| 3,492,649 | 1/1970 | Polillo | 340/150 |
| 4,004,097 | 1/1977 | Spaulding | 340/150 |

*Primary Examiner*—Harold I. Pitts
*Attorney, Agent, or Firm*—Burgess, Ryan and Wayne

[57] ABSTRACT

A data collection system wherein a metering center or central metering station sequentially selects a large number of remote terminal equipment block selectors and through the selected selector sequentially selects a plurality of terminal equipments or meters each for each comsumer belonging to the selected selector whereby the data or readings of the meters may be sequentially read into the metering center. The combinations of two coded signals are used for the selection of the terminal equipment block selectors while one code signal is singly used for selecting one of the terminal equipments. According one aspect of the present invention the terminal equipments having special instruction codes recorded therein are inserted into the groups and blocks to facilitate the switching of readings from one group or block to another.

4 Claims, 10 Drawing Figures

DATA COLLECTION SYSTEM

BACKGROUND OF THE INVENTION

The present invention relates to a novel data collection system for remote reading of the readings of meters each installed for each consumer into a metering center or station in order to compute the consumption of city or town water, gas or electricity.

A variety of systems for permitting a central metering station or metering center to read the indications or readings of a large number of electric, water and gas meters remotely installed each for each consumer have been devised and demonstrated. From the view point of the data transmission methods they may be divided into a system utilizing a power transmission line, a system utilizing a telephone net work and a system utilizing a cleared channel. The present invention relates to the last mentioned system utilizing the cleared channel, and various data collection systems utilizing the cleared channels have been devised and demonstrated.

However, none of them has been successful in practice because the transmission lines interconnecting between the metering center and a large number of terminal equipments such as meters are prohibitively greater in numbers and further because the erroneous selection of more than two terminal equipments tends to occur very frequently. In one type of data collection system each terminal equipment is provided with a decoder to respond a calling or selection signal transmitted from the metering center so that the terminal equipment may be electrically connected to the center. However, the semiconductor elements incorporated into the decoders are frequently subjected to high surge voltages due to thunderbolts or the like and are broken so that the erroneous selection more than two terminal equipments tends to occur very often as described above. The present invention was made to solve the above and other problems encountered in the prior art remote data collection system and is based on the underlying principle that the terminal equipments may be connected to the metering center without the use of the conventional decoders incorporated in the terminal equipments for the selection thereof.

SUMMARY OF THE INVENTION

The main object of the present invention is therefore to provide a data collection system wherein the combinations of two coded signals are used for the selection of remote terminal equipment block selectors and one coded signal is singly used to select one by one the terminal equipments belonging to this selected selector so that the erroneous selection of more than two terminal equipments may be completely eliminated.

A further object of the present invention is to provide a data collection system wherein the electrical interconnection between the metering center or data collection station and a selected terminal equipment is established by the closing of an auxiliary contact bank including a number of contacts caused by the energization of relays which in turn is caused in response to the combination of two coded signals transmitted from the metering center, whereby the erroneous selection of more than two terminal equipments may be completely eliminated.

A further object of the present invention is to provide a remote data collection system wherein the interconnection between the metering center and terminal stations is effected by the relays which are connected to a power source through a minimum number or two power lines, whereby the transmission lines between the metering center and terminal equipments may be minimized in number and consequently the installation cost may be reduced.

A further object of the present invention is to provide a data collection system capable of collecting data from remote terminal equipments with a higher degree of efficiency hitherto unattainable by the prior art data collection systems.

BRIEF DESCRIPTION OF THE DRAWINGS

Same reference numerals are used to designate similar parts throughout the figures.

DESCRIPTION OF THE PREFERRED EMBODIMENTS

Figure 1:
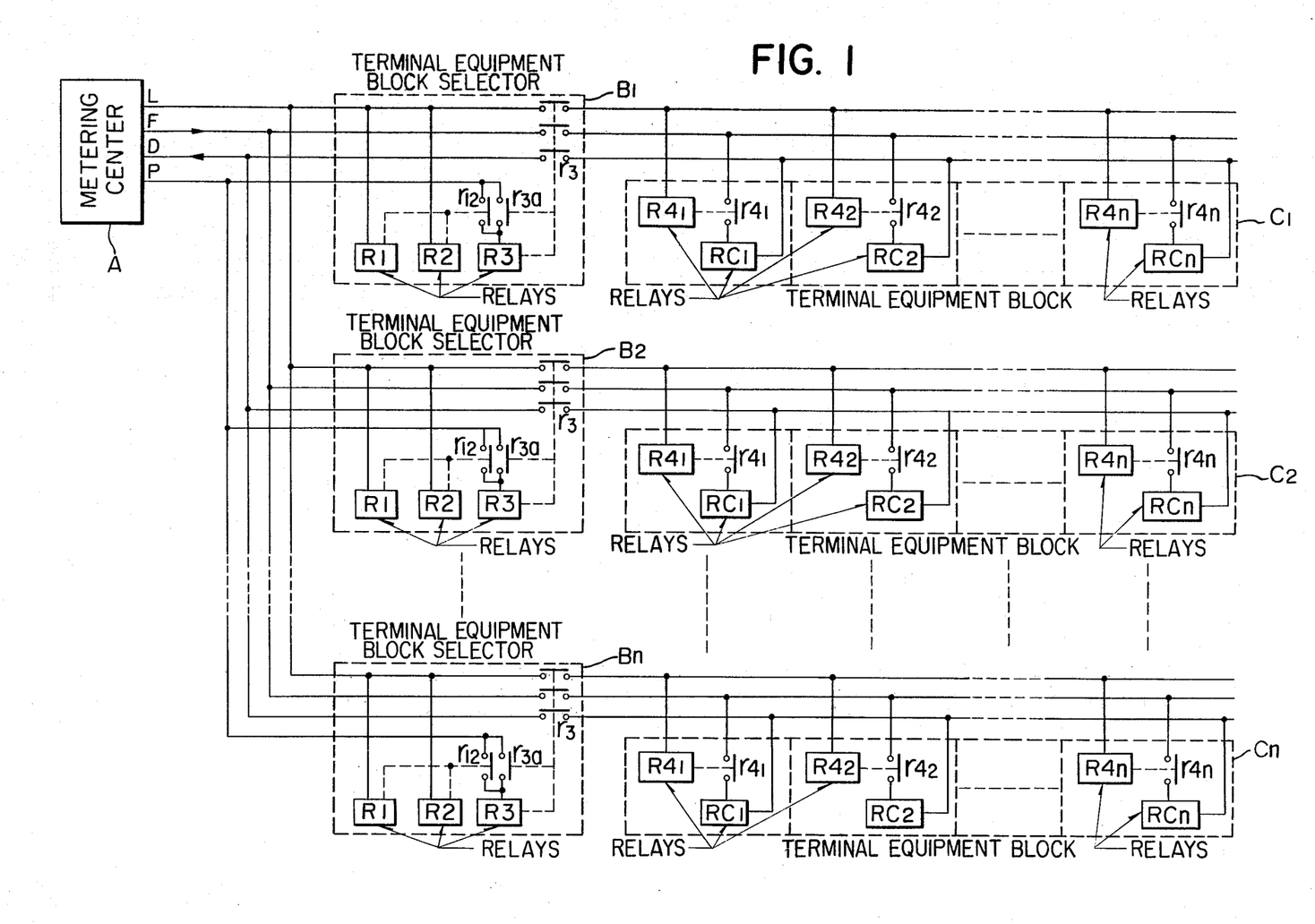
FIG. 1 is an electric circuit diagram used for the explanation of the underlying principle of the present invention.

Underlying Principle, FIG. 1

First referring to FIG. 1, the underlying principle of the present invention will be described. A central metering center A, terminal equipment block selectors $B_1$ through $B_n$ and terminal equipments $C_1$ through $C_n$ are electrically interconnected with each other through terminal equipment selection lines L, digit selection lines F, data output lines D and power lines P. In response to a combination of two coded signal transmitted from the central metering center A through the terminal equipment selection lines L, one of the terminal equipment block selectors $B_1$ through $B_n$ is selected so that relays R1 and R2 in the selected selector are energized. For the sake of simplicity in explanation, it is assumed that the uppermost terminal equipment block selector $B_1$ be selected and its relay R1 and R2 be energized. Then in response to a logical product of the states of the relays R1 and R2; that is, the logical product of the two coded signals, a normal open contact r12 is closed to energize a relay R3, resulting in the closing of a normally open contact bank r3. The current flows through the power line P and the normally open contact r3a into the relay R3 so that even after the relays R1 and R2 have been de-energized as the result of the disappearance of the two coded signals, the relay R3 may be kept energized and consequently the normally open contact bank r3 and self-holding contact r3a may be kept closed, whereby the central metering center A and the terminal equipment block $C_1$ may be kept interconnected to each other.

After the communication between the central metering center A and the terminal equipment block $C_1$ has been established, a coded signal is transmitted from the central metering center A through the terminal selection line L to the terminal equipment block $C_1$ to energize for instance a relay $R4_1$, thereby closing a normally open contact $r4_1$. Thereafter a digit selection signal is transmitted through the center A through the digit selection line F and the reading of a readout counter $RC_1$ is transmitted through the data output line D and read into the central metering center A.

Thereafter another coded signal is transmitted in a manner substantially similar to that described above to energize a relay $R4_2$ to have the reading of a readout counter $RC_2$ transmitted to and read into the center A. In like manner, the readings of readout counters $RC_3$ through $RC_n$ are transmitted and read into the central metering center A. After the reading of the last readout counter $RC_n$, the relay R3 in the terminal equipment selector $B_1$ is de-energized.

In like manner, the readings of the readout counters $RC_1$ through $RC_n$ in the blocks $C_2$ through $C_n$ are read into the central metering center A. Thus all of the required data or readings are collected in the center A.

In summary, the present invention is characterized in that a combination of two coded signals is used to select a terminal equipment block selector B, thereafter one coded signal is used to select a terminal equipment or readout counter RC in the selected block B, and at least two power lines are used to establish the communication between the central metering center A and the terminal equipment blocks.

Figure 2:
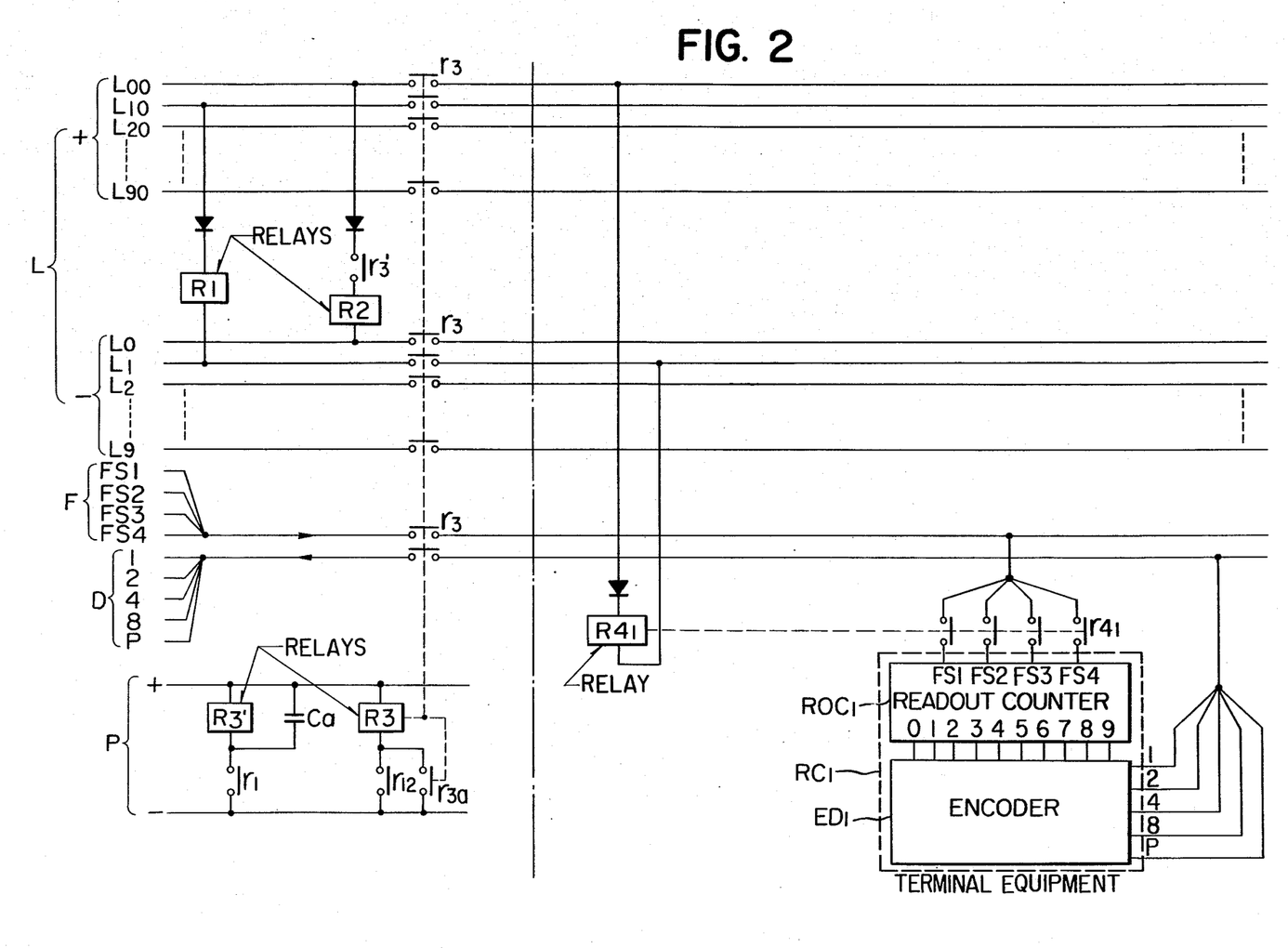
FIG. 2 is an electric diagram of a first embodiment of the present invention.
Figure 3:
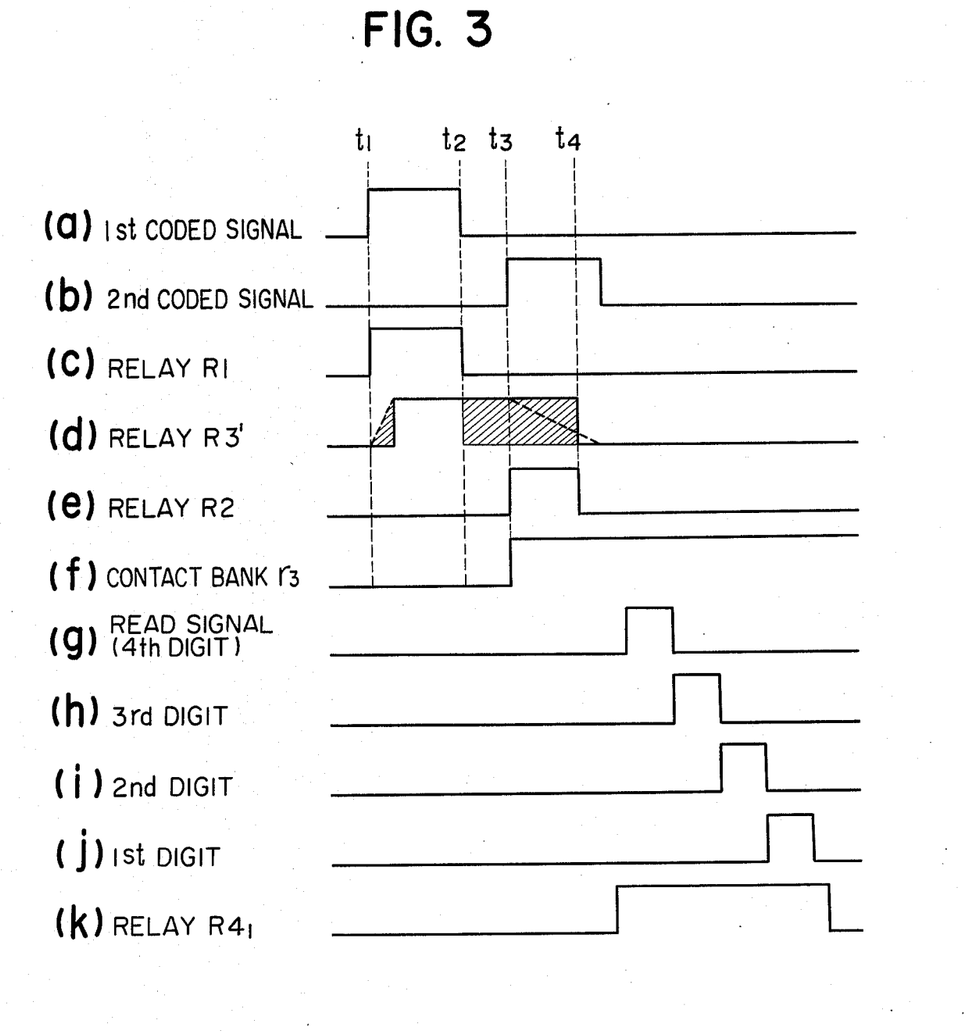
FIG. 3 is a timing chart used for the explanation of the mode of operation thereof.
Figure 4:
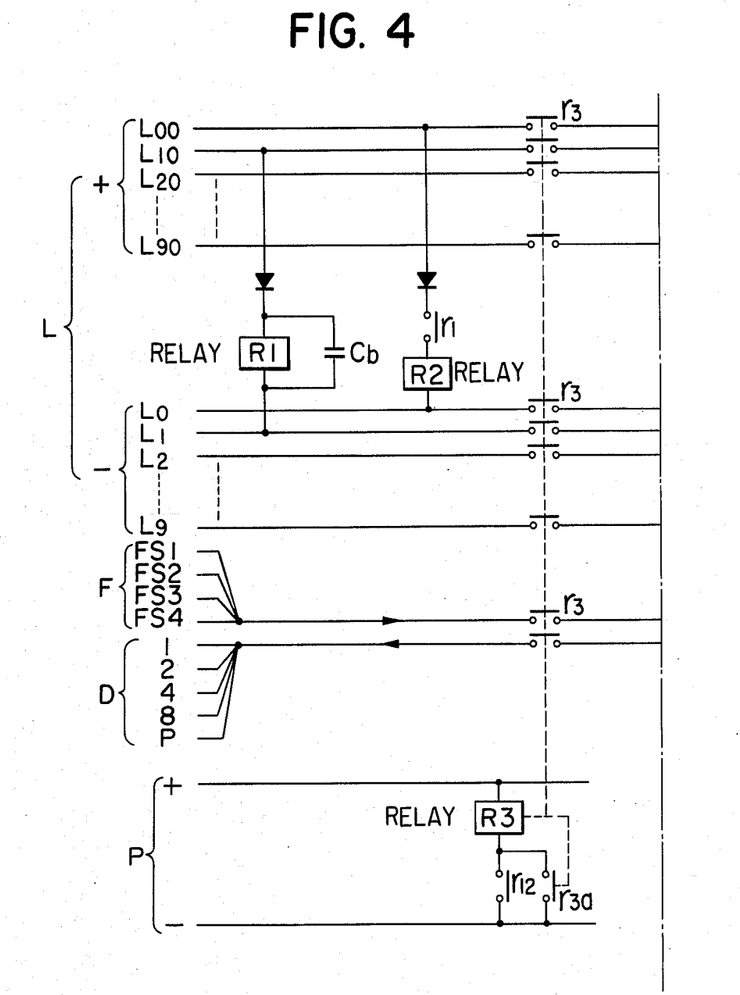
FIG. 4 is an electric circuit diagram of a modification of the first embodiment.

First Embodiment, FIGS. 2 through 4

First referring to FIG. 2, the terminal selection line or bus L consists of 10 lines $L_{00}$ through $L_{90}$ to which is impressed a positive voltage and additional 10 lines $L_0$ through $L_9$ to which is impressed a negative voltage. Thus the terminal selection bus L consists of 20 lines. The digit selection line or bus F consists of four lines Fs1 through Fs4 in case of a four-digit readout counter RC. The data output line or bus D consists of five lines including one used for the check of a battery.

Next referring further to FIG. 3 the mode of operation will be described when the central metering center transmits two coded signals through the terminal selection lines $L_{10}$, $L_1$ and $L_{00}$ and $L_0$. At a time $t_1$ (See FIG. 3), in response to the first coded signal [See FIG. 3(a)] transmitted through the terminal selection lines $L_{10}$ and $L_1$, the relay R1 is energized [See FIG. 3(c)] closing the normally open contact r1 to energize the relay R3' [See FIG. 3(d)], wherein the current flowing through the coil of the relay R3' is indicated by the broken lines and the time lags, by the hatched areas.

At $t_2$, the first coded signal disappears so that the relay R1 is de-energized and consequently the contact r1 is opened again. However the relay R3' is kept energized for some time by a capacitor Ca as indicated by the right hatched area in FIG. 3(d). At $t_3$ the second coded signal [See FIG. 3(b)] is transmitted to energize the relay R2 [See FIG. 3(e)], closing the normally open contact r12 to energize the relay R3. The relay R2 is de-energized at $t_4$ when the normally open contact r3' of the relay R3' is opened, but the relay R3 is kept energized to close the normally open contact bank r3 because a self-holding contact r3a is closed, whereby the central metering center A and the selected terminal equipment block are interconnected to each other even after the second coded signal has disappeared as shown at (f) in FIG. 3.

Thereafter the signal coded signal is transmitted from the center A. For instance, a positive voltage is impressed on the terminal selection line $L_{00}$ while a negative voltage, on the line $L_1$ to energize a terminal equipment selecting realy $R4_1$ [See FIG. 3(k)] thereby closing its normally open contact bank $r4_1$. As a consequence the circuit of the terminal equipment or readout counter $RC_1$ is established.

The terminal equipment $RC_1$ consists of a readout counter $ROC_1$ and an encoder $ED_1$, and in response to a readout signal transmitted through the fourth digit line FS4 of the digit selection bus F [See FIG. 3(g)], the encoder $ED_1$ outputs a binary coded signal representative of a numeric data in the fourth or most significant digit of the readout counter $ROC_1$. This binary coded output signal is transmitted through the corresponding line in the data output bus D and read into the metering center A.

In like manner, the numeric data at the third, second and first or least significant digits are successively read into the central metering center A as indicated at h, i and j in FIG. 3.

As described above, in the first embodiment 20 terminal selection lines are used, and of these 10 lines are impressed with a positive voltage while the remaining 10 lines, with a negative voltage. As a consequence, the combinations for selecting both the relays R1 and R2 are $100 = 10 \times 10$, respectively, so that a number of $10,000 = 100 \times 100$ terminal equipment block selectors may be selected. Since each block consists of $100 = 10 \times 10$ terminal equipments, the total number of $1,000,000 = 10,000 \times 100$ terminal equipments may be selected and their readings may be read into the central metering center A.

With this arrangement there is a fear that in response to one coded signal for selecting a terminal equipment not only the correct terminal equipment but also another terminal equipment are activated when the coded signal is similar to a coded signal of the terminal equipment erroneously activated. In order to overcome this problem, the second coded signal for activating the relay R2 is transmitted exclusively through for instance the lines $L_{00}$ and $L_0$ in practice so that the number of combinations for selecting terminal equipments become $99 = 100 - 1$. As a result the total number of terminal equipments becomes 9,900.

However, the number of 1,000,000 terminal equipments may be used in the manner described above if the space between the coded signals for selecting the terminal equipments is increased and if a relay corresponding to the relay R3' is completely de-energized after a relay corresponding to the relay R1 has been energized and prior to the energization of a relay corresponding to the relay R2 by reducing the lag time of the relay R3'.

In FIG. 4 there is shown a modification of the first embodiment. The relay R3' of the first embodiment is eliminated and instead a capacitor Cb is connected in parallel with the relay R1 so that the latter may have a time lag. Upon the closing of the normally open contact r1 of the relay R1 the relay R2 is energized. The mode of operation of this modification is substantially similar to that of the first embodiment described above.

Figure 5:
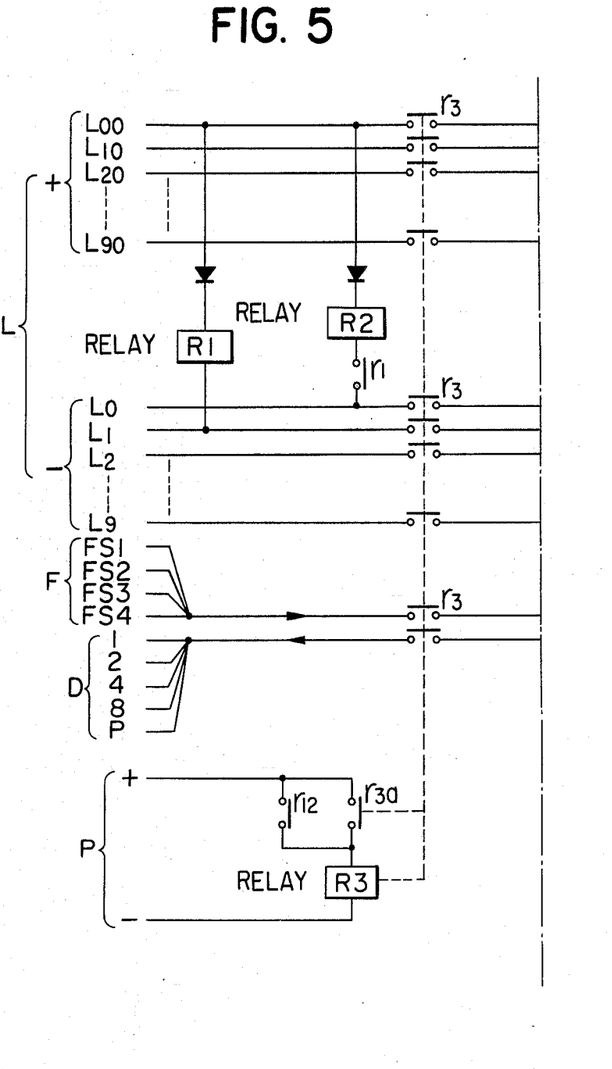
FIG. 5 is a fragmentary electric circuit diagram of a second embodiment of the present invention.

Second Embodiment, FIG. 5

The second embodiment shown in FIG. 5 is different from the first embodiment described hereinbefore in that the two coded signals for selecting a terminal equipment block selector or for energizing the relays R1 and R2 are transmitted simultaneously. That is, according to the second embodiment both the relays R1 and R2 are almost simultaneously energized macroscopically, but microscopically first the relay R1 is energized to close its normally open contact r1 and then the relay R2 is energized to close its normally open contact r12 to energize the relay R3. The relay R3 closes its normally open contact r3 and is kept energized because its self-holding contact r3a is closed. Thereafter the readings of the terminal equipments are read into the metering center in a manner substantially similar to that described in conjuction with the first embodiment.

In the second embodiment 100 coded signals are used so that the combinations of two coded signals equal to $4,950 = {}_{100}C_2$. These coded signals are used for energizing the relays, but the combination of two coded signals tends to cause four relays to be simultaneously energized because the current flows into the relays not selected. To solve this problem either of the positive or negative terminals of the relays R1 and R2 are connected to a common line. Then with two coded signals $450 = 45 \times 10 ({}_{10}C_2 \times 10)$ terminal equipment block selectors may be used, and each selector may be connected to 100 terminal equipments. As a result, $45,000 = 450 \times 100$ terminals equipments are selected and their readings may be read into the meter center.

Figure 6:
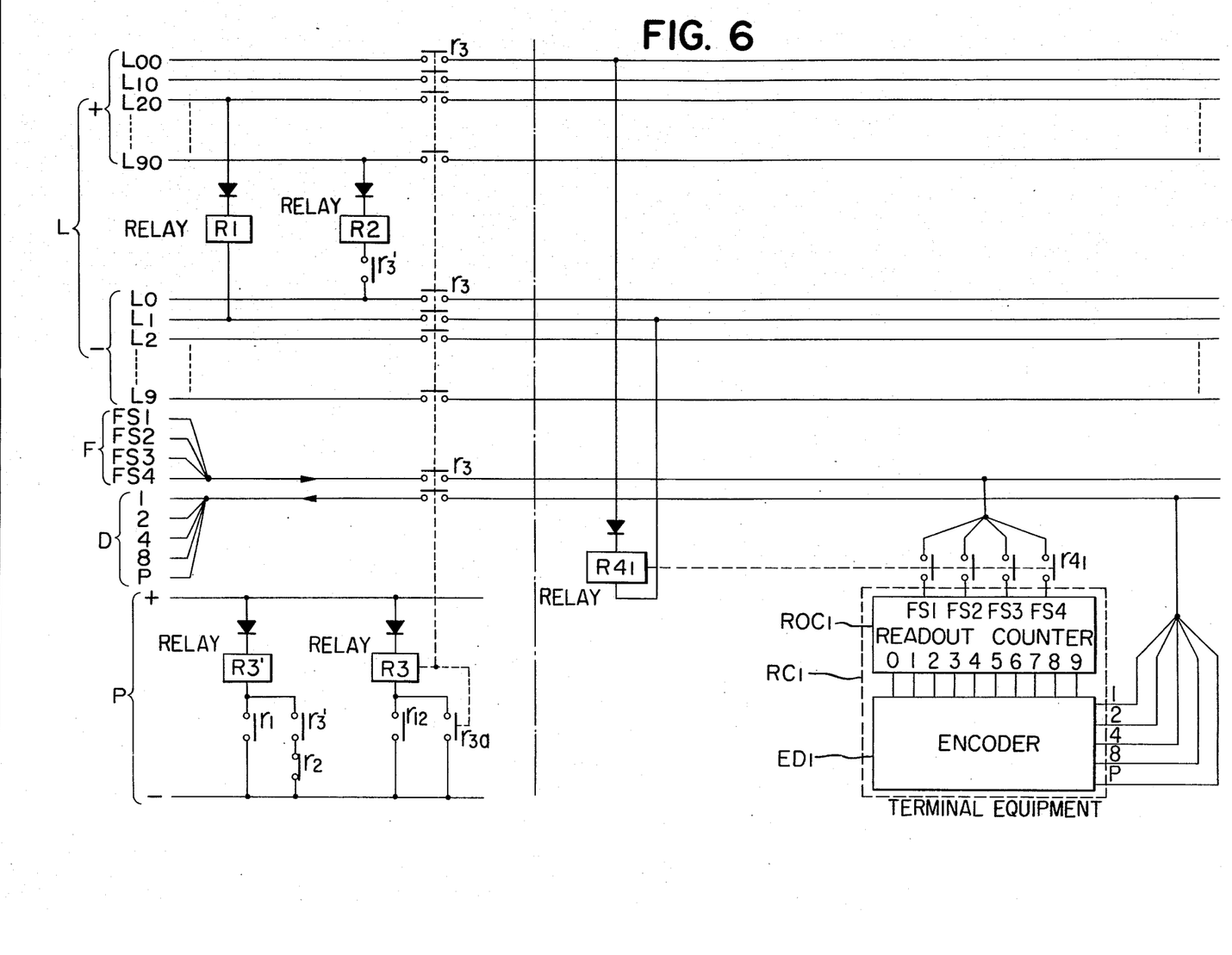
FIG. 6 is an electric diagram of a third embodiment of the present invention.

Third Embodiment, FIG. 6

In the third embodiment shown in FIG. 6 the total of 19 terminal selection lines are used consisting of 9 lines $L_{00}$ through $L_{80}$ impressed with a positive voltage and 10 lines $L_0$ through $L_9$ impressed with a negative voltage so that the total of 90 coded signals may be used for energizing the relays R1. The positive terminals of the relays R2 are connected to a common terminal selection line $L_{90}$ impressed with a positive voltage while the negative terminals, to the lines $L_0$ through $L_9$ impressed with the negative voltage. As a result, 10 coded signals are used to energize the relays R2. Therefore the total number of $900 = 90 \times 10$ terminal equipment block selectors may be selected. When the coded signals for selecting the relays R1 are also used for the selection of the terminal equipments, 90 terminal equipments may be connected to each block selector so that the total number of $81,000 = 900 \times 90$ terminal equipments may be selected and their readings may be read into the metering center A.

In FIG. 6 the relay R1 is energized by the signal transmitted through the selection lines $L_{20}$ and $L_1$ so that its normally open contact r1 is closed to energize the relay R3'. Once the relay R3' is energized its normally open contact r3'' is closed so that the relay R3' may be kept energized. The normally open contact r3' is also closed so that the input circuit of the relay R2 may be established.

When the second coded signal is transmitted through the selection lines $L_{10}$ and $L_0$ the relay R2 is energized to open its normally closed contact r2 to de-energize the relay R3'. The normally open contact r12 is closed to energize the relay R3. Once the relay R3 is energized its self-holding contact r3a is kept closed so that the relay R3 is kept energized while the normally open contact bank r3 is kept closed.

Alternatively, the relay R3' may be so arranged as to be de-energized by the energization of the relay R3 instead of the relay R2. In addition, the relays R1, R2, R3' and R3 may be energized and de-energized in a manner substantially similar to that of the first or second embodiment, but is should be noted that in the third embodiment the relays R1 and R2 are energized in response to the coded signals transmitted through different terminal selection lines.

Figure 7:
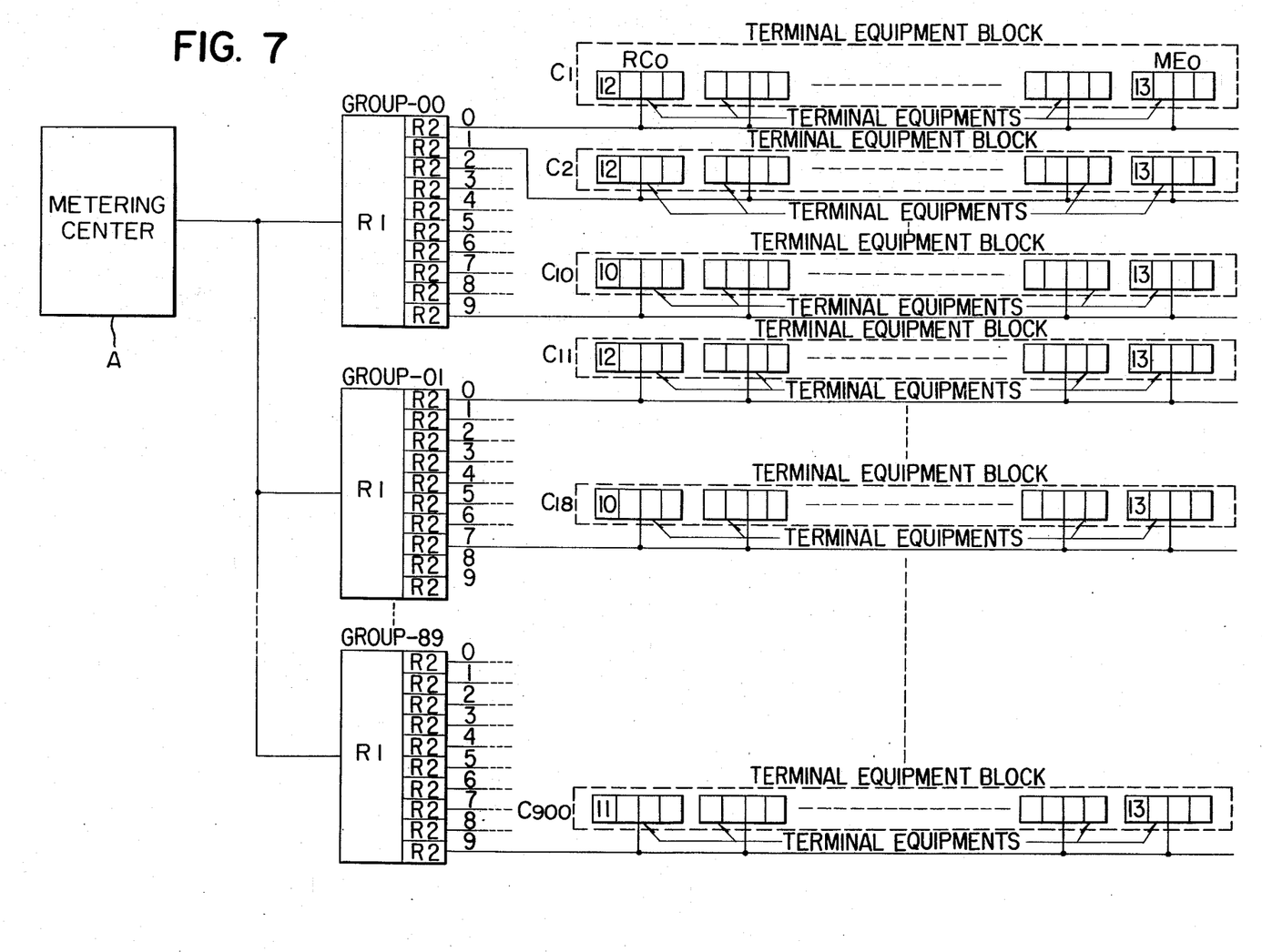
FIG. 7 is a diagram used for the explanation of the mode of data collection or reading of meters.

In FIG. 7 there is shown a diagram of the interconnection between the relays R1 and R2 and the terminal equipment blocks. The relays R1 are assigned with 90 coded signals from 00 through 89, and in this specification for the sake of explanation one coded signal each assigned to the register R1 is referred to as "the group". Then the relays R2 may be assigned with 10 coded signals from 0 through 9 for each group and the coded signal for the relay R2 is referred to as "the block" in this specification. Thus in the third embodiment shown in FIG. 6 the total of 90 groups × 10 blocks = 900 terminal equipment block selectors may be selected, and when the coded signals for selecting the relays R1 are used for selecting the terminal equipments, one block may select the maximum number of 90 terminal equipments. As a result, $81,000 = 90$ (groups) $\times 10$ (blocks) $\times 90$ (terminal equipments per block) may be selected.

In the third embodiment, the line $L_{90}$ for selecting the block or relay R2 is not used for the selection of the terminal equipments, so that an erroneous selection of terminal equipment may be completely eliminated. So far the relays R1 have been described as being assigned with the coded signals from 0 through 89 while the relays R2, with the codes from 0 through 9, but it is understood that the number of codes and the combinations thereof may be suitably selected depending upon various conditions. For instance, in the third embodiment shown in FIG. 6 the number of groups may be 50 while the number of blocks, also 50 so that the total number of 2,500 terminal equipment block selectors may be used. Since each block may be connected to 50 terminal equipments, the total number of 125,000 terminal equipments may be used. With 95 groups and 5 blocks, the total of $45,125 = 95 \times 5 \times 95$ terminal equipments may be used.

Mode of Data Collection, FIG. 7

So far the terminal equipments have been described as the readout counters or meters, but in practice the first and last terminal equipments in each block have special codes as shown in TABLE 1 so that the switching between the groups and between the blocks may be effected smoothly as will be described in more detail hereinafter.

TABLE 1

|  | Digit or field | 4th (control code) | 3rd | 2nd | 1st | Explanation |
|---|---|---|---|---|---|---|
| Meter Selection No. | Block end | 10 | ←Block No.→ | ←Group No.→ | → | *a |
|  | Group end | 11 | ←"→ | ←"→ | → | *b |
|  | Advance | 12 | ←"→ | ←"→ | → | *c |
| Meter end (Meter selection No. may be arbitrarily |  | 13 | ← | ←Meter No. → | → | *d |

TABLE 1-continued

| Digit or field | 4th (control code) | 3rd | 2nd | 1st | Explanation |
|---|---|---|---|---|---|
| selected.) | | | | | |

Remarks:
The instructions *a, *b, *C and *d are all executed in the meter center.
*a = increment a group counter by + 1 in response to the reading of a meter end code.
*b = complete the reading in response to the reading of a meter end code.
*c = increment a block counter by + 1 in response to the reading of the meter end code.
*d = execute the instructions *a, *b and *c.

The control code may be suitably selected from 10 to 15, but for the sake of explanation the control codes 10 through 13 are used. However, the remaining codes 14 and 15 may be suitably used if necessary.

The mode of data collection will be described with particular reference to TABLE 1 and FIG. 7 in conjunction with the selection of the terminal equipment block $C_1$ of the first group 00 and the first block 0. In the first terminal equipment $RC_0$ with the address 0 the group number is recorded in the first and second digits or fields; the block number, in the third digit or field; and the control code 12 is binary coded and recorded in the fourth digit or field as shown in TABLE 1. Therefore when the metering center A selects the group 00 and the block 0 and then selects the first terminal equipment $RC_0$ in the terminal equipment block $C_1$, it is confirmed that the selected terminal equipment belongs to the group 00 and the block 0.

In the third embodiment, the maximum number of 90 terminal equipments may be connected to each block, but the first and last terminal equipments are assigned with special codes as described above so that the maximum number of terminal equipments for each block is 88 in practice. However, it does not necessarily follow that 88 meters are connected to one block, and the number of terminal equipments for each block may be suitably selected. For instance assume that the present invention be applied to a "DANCHI" or a housing area where a number of apartment buildings of four or five stories or above are constructed by Japan Housing Corporation. Then the number of meters in each apartment building is 40 to 60. Assume that each building has 50 meters, and then the data collection system in accordance with the present invention must be so installed that after the reading of the 50th meter or 51st terminal equipment has been read into the metering center A the reading of the next block $C_2$ must be started. To this end, connected to the 50th meter as the 52nd is a terminal equipment $ME_0$ wherein the meter number is recorded in the first, second and third digits or fields and the control code 13 (See TABLE 1) is recorded in the fourth digit or field. When the terminal equipment $ME_0$ with the meter end code 13 is read out, the block counter in the metering center A is incremented by 1 to start the reading of the next block. In like manner, the terminal equipments in respective blocks in the group 00 are selected and read out, and when the last block 9 is selected the group selection counter in the metering center is incremented by 1 after the last terminal equipment of the last block has been read out because the first terminal equipment of this block has the control code 10 recorded in the fourth digit or field. As a result, the next group 01 is selected and the terminal equipments are selected and read in the manner described above. In like manner the remaining groups are successively read out. In the first terminal equipment of the last block 9 of the last group 89, the control code 11 is recorded in the fourth digit or field so that upon reading of the last terminal equipment of the last block of the last group, the readings of all meters are completed.

When the terminal equipments are assigned with the special codes and inserted in suitable locations in the data collection system in the manner described above, the number of groups, the number of blocks and the number of terminal equipments per block may be suitably selected and the switchings from one block to another and from one group to another may be much facilitated so that a large number of meters may be read into the metering center within a very short time.

Figures 8, 8B:
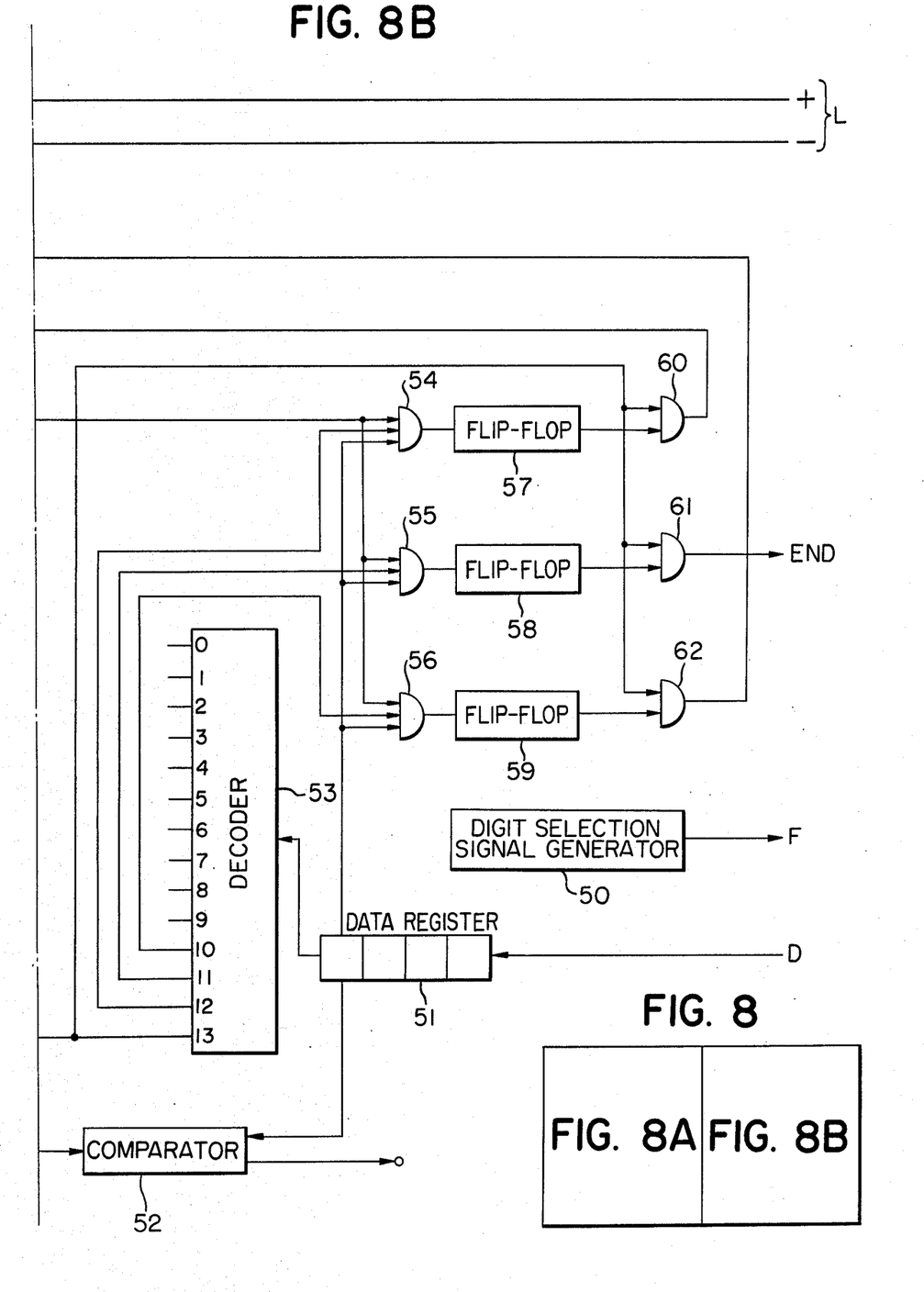
FIG. 8, the combination of FIGS. 8A and 8B, is a diagram of a control circuit incorporated in a metering center.
Figure 8A:
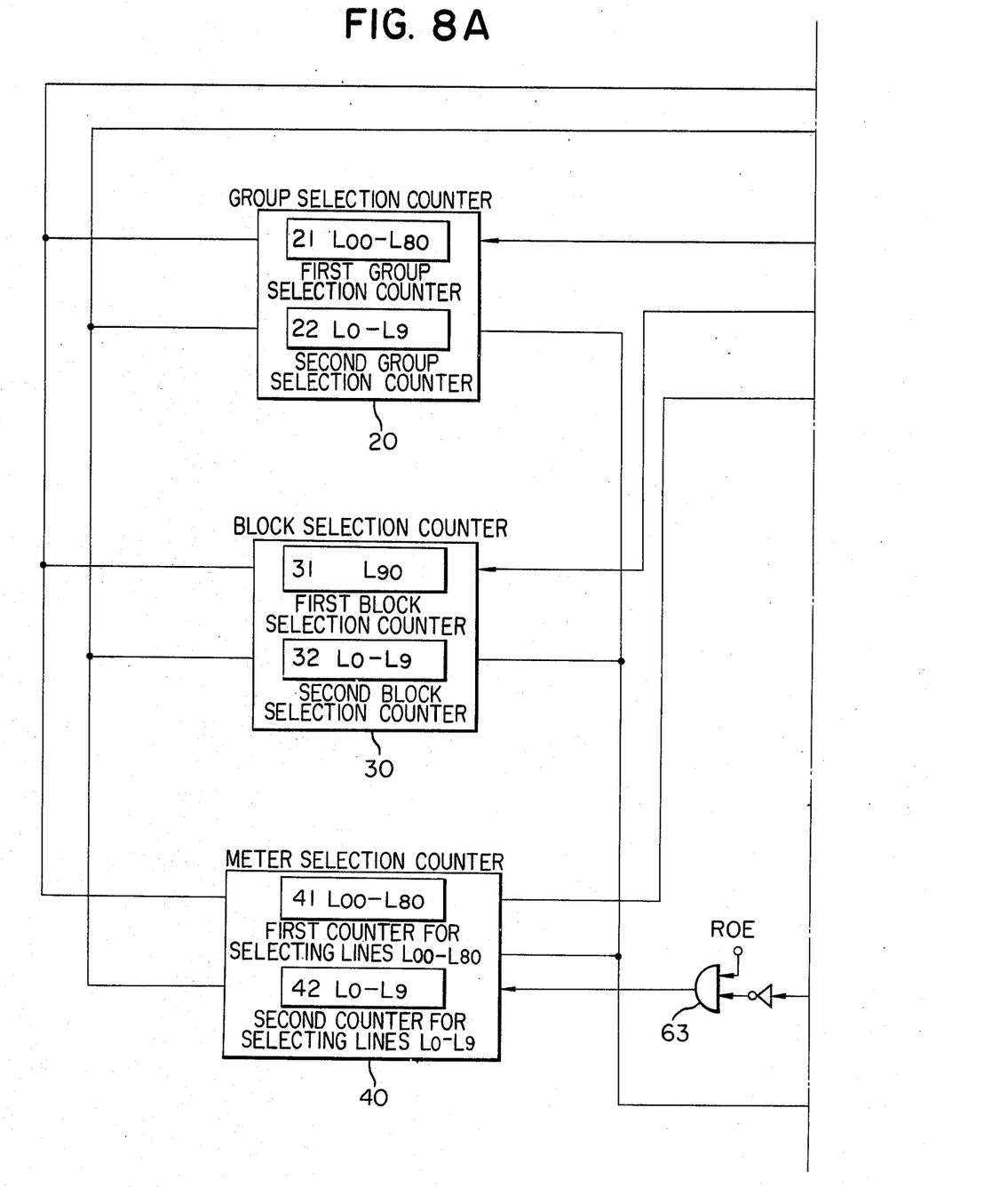

Control Circuit in Metering Center and Mode of Operation Thereof, FIG. 8

The control circuit and mode of operation of the metering center will be described with reference to FIG. 8 and in conjunction with the third embodiment shown in FIG. 6. In FIG. 8, reference numeral 20 denotes a group selection counter; 21, a first group selection counter for monitoring the terminal selection lines $L_{00}$ through $L_{80}$; 22, a second group selection counter for monitoring the terminal selection lines $L_0$ through $L_9$, the first and second group selection counters 21 and 22 controlling and monitoring the relays R1 and hence the 90 groups of the terminal equipment block selectors; 30, a block selection counter; 31, a first block selection counter for monitoring the selection line $L_{90}$; 32, a second block selection counter for selecting and monitoring the selection lines $L_0$ through $L_9$, the counters 31 and 32 controlling the relays R2 and hence 10 blocks so that the group selection counter 20 and the block selection counter 30 may select and monitor the total of 900 group ($C_1$ through $C_{900}$ in FIG. 7); 40, a meter selection counter consisting of a first counter for selecting and monitoring the terminal selection lines $L_{00}$ through $L_{80}$ and a second counter for selecting and monitoring the lines $L_0$ through $L_9$ so that the total number of 90 terminal equipments may be selected and monitored.

The group selection counter 20 is initially set to "0", and when a gate circuit of the counter 20 is opened the first coded signal is transmitted through the terminal selection lines $L_{00}$ and $L_0$ to energize the relay R1 whereby the group 00 is selected. Thereafter a gate circuit of the block selection counter 30 is opened to transmit the signal through the selection lines $L_{90}$ and $L_0$ to energize the relay R2 whereby the block 0 is selected. Thus the metering center A and the first terminal equipment block $C_1$ are interconnected. Next a gate circuit of the meter selection counter 40 is opened to select the first terminal equipment with the address 0 of the terminal equipment block $C_1$. Next the digit or field selection signals are sequentially transmitted through the digit or field selection bus F consisting of the lines FS1 through FS4 so that the special codes recorded in the first terminal equipment are transmitted through the data bus D to a data register 51 and temporarily stored in the data register 51 to be compared in a comparator 52 with the contents in the counters 20 and 30 to check whether the terminal equipments are read out to the block 0 of the group 00 or not. Meanwhile the output from the data register 51 is also transmitted to a decoder 53 and is stored in it. The data in the fourth digit or field, that is, the code 12 is applied to an AND gate 54 to which are also applied the contents "0" of the meter selection counter 40, and the output from the AND gate 54 is stored in a flip-flop 57.

Thereafter a readout end signal is applied to a ROE terminal of an AND gate 63 so that the meter selection counter 42 is incremented by 1 to select the first meter or the second terminal equipment and the reading of this meter is read into the metering center in the manner described above.

When the last terminal equipment assigned with the special codes of the terminal equipment block $C_1$ is selected, the codes in the first, second and third digits or fields thereof are compared with the contents of the group selection counter 20 and the block selection counter 30. When they coincide with each other, the reading of the next terminal equipment block is started, but in case of the incoincidence a group or block error may be detected. Since the meter end code 13 is recorded in the fourth digit or field as described above, an output signal is derived from an AND gate 60, causing the block selection counter 30 to increment by 1 to select the next block or terminal equipment block $C_2$.

In this case, the meter number recorded in the first, second and third digits or fields may be compared with the contents of the meter selection counter 40. Thereafter in response to the output signal from a digit or field selection signal generator 50, the first terminal equipment assigned with the special codes of the terminal equipment block $C_2$ is selected, and thereafter the readings of the terminal equipments are read into the metering center A in the manner described above.

When the terminal equipment having the block end code 10 recorded in the fourth digit or field is selected, an output signal is derived from an AND gate 56 and is stored in a flip-flop 59 so that after the reading of this block the group selection counter 20 must be incremented by 1. When the last terminal equipment having the special code 13 recorded in the fourth digit or field is selected, an output signal is derived from an AND gate 62, causing the group selection counter 20 to be incremented by 1 to select the second group 01. In like manner, the respective blocks and groups are successively switched from one to another and read into the metering center A.

When the first terminal assigned with the special code 11 of the last block of the last group is selected, this special code 11 is stored through an AND gate 55 in a flip-flop 58 as with the advance code 12 or block end code 10. When the terminal equipment having the special code or meter end code 13 is selected, the signal representative of the end of readings of meters is derived from an AND gate 61. Thus the data collection is completed. It is well known to those skilled in the art that in response to the detection of the meter end code 13, the meter selection counter 40 is reset to "0" while the block selection counter 30 is incremented by 1; upon detection of the block end code 10, the block selection counter 30 is reset to "0" while the group selection counter 20 is incremented by 1; and upon detection of the group end code 11, all of the counters are reset.

What is claimed is:

1. A data collection system of the type wherein a metering center sequentially selects a number of remote terminal equipment block selectors and then through the selected terminal equipment block selector sequentially selects a plurality of terminal equipment units connected to said selected selector thereby reading the data of said terminal equipment unit into said metering center, comprising:
   a terminal equipment selection bus comprising a plurality of terminal equipment selection lines for selecting one of said terminal equipment block selectors and for subsequently selecting one of the terminal equipment units connected to said one block selector;
   first means at said metering center for sequentially applying first and second corresponding coded signals of limited duration to said terminal equipment selection bus;
   power lines for coupling said metering center to said terminal equipment block selectors;
   a data output bus comprising lines for coupling said metering center to said terminal equipment block units;
   second means associated with said one terminal equipment block selector comprising latching means for coupling said terminal equipment selection bus and said data output bus to all of the terminal equipment units connected to said one terminal equipment block selector, in response to said sequentially applied corresponding first and second coded signals;
   third means at said metering center for applying a third coded signal to said terminal equipment selection bus, after said first and second coded signals have terminated, to energize a selected one of the terminal equipment units connected to said one selected terminal equipment block selector, to cause meter data from said energized unit to be transferred to said metering center, via said data output bus; and
   fourth means for de-energizing said second means after termination of said third coded signal, to uncouple said terminal equipment selection bus from said terminal equipment units connected to said one terminal equipment block selector.

2. The data collection system according to claim 1, wherein said second means comprises:
   a first relay actuable in response to said first coded signal;
   a second relay actuable in response to said second coded signal;
   a third latching relay actuable in response to the logical product of the actuation of said first and second relays after termination of said first coded signal; and
   a power bus for coupling said terminal equipment block selectors to said metering center.

3. A data collection system according to claim 2, further comprising a fourth relay connected to said power bus and energizable in response to the energization of said first relay, means for keeping said fourth relay energized for a predetermined time after said first relay has been de-energized, a normally open auxiliary contact on said fourth relay for completing an electric circuit of said second relay for said predetermined time, so that said second relay may be energized and means for energizing the third relay in response to the energization of said second relay.

4. A data collection system as set forth in claim 2 wherein said first relay is energized in response to said first coded signal and is kept energized for a predetermined time after the disappearance of said first coded signal and has a normally open auxiliary contact for establishing the electric circuit of said second relay for said predetermined time so that said second relay may be energized, and said third relay is energized in response to the energization of said second relay.

* * * * *

UNITED STATES PATENT AND TRADEMARK OFFICE
CERTIFICATE OF CORRECTION

PATENT NO. : 4,162,484
DATED : July 24, 1979
INVENTOR(S) : Takeshi Abe, et al

It is certified that error appears in the above—identified patent and that said Letters Patent is hereby corrected as shown below:

In the Abstract, line 6: "comsumer" should be --consumer--.

line 12: After "According" insert --to--.

Column 1, line 30: After "respond" insert --to--.

line 36: After "selection" insert --of--.

Column 2, line 45: "signal" should be --signals--.

line 55: "normal" should be --normally--.

Column 4, line 5: "realy" should be --relay--.

line 24: After "these" insert --,--.

Column 5, line 12: After "embodiment" insert --,--.

line 18: After "problem" insert --,--.

line 24: "terminals" should be --terminal--.

Column 6, line 10: "is" should be --it--.

UNITED STATES PATENT AND TRADEMARK OFFICE
CERTIFICATE OF CORRECTION

PATENT NO. : 4,162,484
DATED : July 24, 1979
INVENTOR(S) : Takeshi Abe, et al

It is certified that error appears in the above—identified patent and that said Letters Patent is hereby corrected as shown below:

Column 7, in Table 1-continued, line 1 under "Remarks:":
"*C" should be --*c--.

Column 11, line 1: after "claim 2" insert --or 3--.

Signed and Sealed this

Fourth Day of March 1980

[SEAL]

Attest:

SIDNEY A. DIAMOND

Attesting Officer    Commissioner of Patents and Trademarks